United States Patent Office 3,456,024
Patented July 15, 1969

3,456,024
PREPARATION OF PERFLUOROALKYL HALIDES
Lorne A. Loree, Midland, Mich., assignor to Dow Corning Corporation, Midland, Mich., a corporation of Michigan
No Drawing. Continuation-in-part of application Ser. No. 517,902, Jan. 3, 1966. This application July 5, 1966, Ser. No. 562,485
Int. Cl. C07c *19/08, 21/18, 17/00*
U.S. Cl. 260—653                         7 Claims

ABSTRACT OF THE DISCLOSURE

A method of halogenation to produce $R_fX'$ and $X'R'_fX'$, where $R_f$ is a perfluoroalkyl radical, $R'_f$ is a perfluoroalkylene radical, and $X'$ is chlorine or bromine. An illustrative example being:

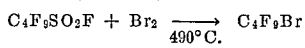

$$C_4F_9SO_2F + Br_2 \xrightarrow[490°C.]{} C_4F_9Br$$

---

This application which is a continuation-in-part of U.S. application No. 517,902, filed on January 3, 1966, now abandoned, relates to a process for the preparation of perfluoroalkyl halides.

Perfluoroalkyl chlorides and bromides are valuable as intermediates in the preparation of polymeric fluids, resins, and elastomers which have perfluoroakyl side chains and can therefore be oleophobic and highly nonreactive.

For example, a perfluoroalkyl chloride or bromide can be reacted with ethylene under free radical-forming conditions, e.g. in the presence of heat and free-radical forming catalysts such as dicumylperoxide or ditertiarybutyl peroxide, or in the presence of an electric arc, ultra-violet light, X-rays, or gamma-rays such as those from a cobalt 60 source to form $R_fCH_2CH_2Br$, where $R_f$ is a perfluoroalkyl radical. This reaction is preferably performed under at least 20 p.s.i. of ethylene.

The produce of this reaction can then be dehydrobrominated or dehydrochlorinated by heating with an alkali metal hydroxide such as NaOH, or by any other known method, to form $R_fCH=CH_2$.

This useful product can be homopolymerized to form vinylic polymers which have high melting points and solvent resistance, and it can be copolymerized with other vinylic monomers such as ethylene, propylene, butadiene, styrene, acrylonitrile, ethylacrylate, methylmethacrylate, vinylidene fluoride, and vinylchloride to form useful polymers.

The above product can also be reacted with silanes which contain silicon-bonded hydrogen in the presence of platinum by the known reaction (e.g.)

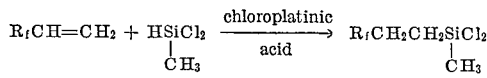

$$R_fCH=CH_2 + HSiCl_2 \xrightarrow[\text{acid}]{\text{chloroplatinic}} R_fCH_2CH_2SiCl_2$$
$$\quad\quad\quad\quad\quad\quad\quad\quad | \quad\quad\quad\quad\quad\quad\quad\quad\quad\quad\quad\quad\quad\quad |$$
$$\quad\quad\quad\quad\quad\quad\quad CH_3 \quad\quad\quad\quad\quad\quad\quad\quad\quad\quad\quad\quad\quad\quad\quad CH_3$$

Silanes of this type are then hydrolyzable to form fluids, elastomers, and resins which have unsurpassed solvent and oxidation resistance.

This application relates to the process comprising reacting (a) a compound selected from the group consisting of (1) $R_fSF_5$, (2) $R_fSO_2X$, (3) $(R_fSO_2)_2O$, (4) $HR'_fCH_2OH$, (5) $R_fH$ and (6) $R_f(CH_2CH_2)_nX'$ with (b) a halogen selected from the group consisting of chlorine and bromine at a temperature of 450° to 700° C. whereby a compound selected from the group consisting of $R_fX'$ and $X'R'_fX'$ is produced, where $R_f$ is a perfluoroalkyl radical, $R'_f$ is a perfluoroalkylene radical of at least 2 carbon atoms, X is selected from the group consisting of fluorine, chlorine, bromine, and the hydroxyl group, $X'$ is selected from the group consisting of chlorine and bromine, and $n$ has a value of 1 through 5.

Unexpectedly high yields of the above stated products are obtained from this reaction, especially when the reaction temperature is from 490° to 570° C.

$R_f$ can be any perfluoroalkyl radical, e.g. primary perfluoroalkyl radicals such as trifluoromethyl, heptafluoropropyl, n-perfluorobutyl, $(CF_3)CFCF_2CF_2CF_2$—, n-perfluoroheptyl,

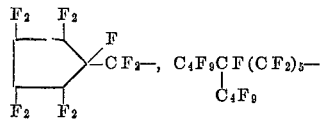

and n-perfluorooctadecyl; secondary radicals such as

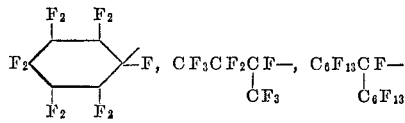

and

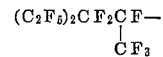

and tertiary radicals such as $(CF_3)_3C$— and

The preferred radicals are the primary perfluoroalkyl radicals of 4 to 14 carbon atoms, particularly those which are n-perfluoroalkyl, the best yields being generally obtained therefrom.

$R'_f$ can be any perfluoroalkylene radical of at least 2 carbon atoms, e.g.

—$CF_2CF_2$—, $CFCF_2$—, —$(CF_2CF_2)_2$—, —$(CF_2CF_2)_5$— and

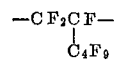

Several varieties of ingredient 4, which contains the $R'_f$ group, are currently available from the DuPont Chemical Corporation, for example, $H(CF_2CF_2)_2CH_2OH$.

It is generally preferred for the reaction to be performed in the presence of an inert substrate through which the reacting vapors can pass, although this is not an absolute requirement. This permits the performance of the reaction at a lower temperature, as a longer contact time is obtained between the reactants. Examples of such an inert substrate are powdered carbon, nickel turnings, alumina, glass beads, or fibers (when the reaction mixture is nonreactive to glass), ceramic chips, and any other material which will be solid and inert under the reaction conditions. Improved yields are generally obtained through the use of this substrate.

The reaction time is not critical, although for any given set of reaction conditions there is generally a reaction time which yields a maximum amount of product.

It is preferred for a molar excess of bromine or chlorine to be present in order to maximize the yield of the reaction.

The reactant $R_fSF_5$ can be prepared by electrolyzing an alkyl mercaptan having the desired carbon chain structure in anhydrous HF in accordance with the disclosures of the Simons Patent U.S. 2,519,983.

The reactants $R_fSO_2X$ and $(R_fSO_2)_2O$ can be prepared in accordance with the disclosures of the Brice et al. Patent U.S. 2,832,398.

The reactant $R_fH$ is well known, while the reactant $R_f(CH_2CH_2)_nX'$ can be prepared by the reaction of ethylene with a perfluoroalkyl bromide under free radical forming conditions.

The reaction can be operated in any manner wherein the above reaction conditions are achieved. A reaction tube, a bomb, or a flask are all operative reaction sites. The reaction can be operated either at standard or increased pressures.

The process of this invention produces perfluoroalkyl and perfluoroalkylene chlorides and bromides, in yields which can exceed 80 percent.

A particularly useful synthesis route which incorporates the process of this invention, along with other steps of synthesis, is as follows:

(1) Electrolyzing for a period of hours a current-conducting mixture of (a) a compound of the formula RSH, where R is an alkyl radical and (b) liquid, essentially anhydrous hydrogenfluoride at a cell voltage which is insufficient to produce significant amounts of free fluorine under the existing conditions, but which is sufficient to cause the production of an electrolysis product of the formula $R_fSF_5$, where $R_f$ is a perfluoroalkyl radical;

(2) Reacting said perfluoroalkyl-containing sulfur compound with bromine or chlorine at a temperature of 450° to 700° C. to form a perfluoroalkyl halide.

(3) Reacting said perfluoroalkyl halide with ethylene under free radical-forming conditions to form $$R_fCH_2CH_2X'$$

where $R_f$ is a perfluoroalkyl radical and $X'$ is bromine or chlorine;

(4) Dehydrohalogenating said product to form $$R_fCH=CH_2$$

The byproduct of step 3, compounds of the formula $R_f(CH_2CH_2)_mX'$ where $m$ has a value of 2 or higher, can be reconverted into $R_fX'$ by reacting it with more bromine or chlorine at a temperature of about 450° to 525° C., and it can then be recycled through step 3.

The product of step 3 above is useful for direct attachment to a halosilane by well-known Grignard techniques.

The dehydrohalogenation step utilizes a well-known chemical process. The reaction is usually performed in the presence of an alkali, e.g. organic bases such as tributylamine or inorganic bases such as sodium hydroxide, at elevated temperatures.

The above process can be performed using either chlorine or bromine as a reactant. Essentially the same results are achieved in both cases. If chlorine is used in step 2, it proceeds with improved yield and appears to require less of an excess of halogen reactant for the best results than does the analogous bromination reaction. The reaction of $R_fCl$ with ethylene (step 3) is, however, more difficult than the reaction of $R_fBr$ with ethylene. Generally the best results are achieved when the reaction of $R_fCl$ is performed in the presence of gamma radiation rather than peroxide catalysts.

The reaction of another useful process which incorporates this invention is (1) Reacting a compound of the formula $HR'_fCH_2OH$ with chlorine or bromine in the presence of an inert substrate at a temperature of 490° to 650° C. to form $X'R'_fX'$ where $R'_f$ is a perfluoroalkylene radical of at least 2 carbon atoms, $X'$ is chlorine or bromine;

(2) Reacting $X'R_fX'$ with ethylene under free radical forming conditions to form $X'CH_2CH_2R'_fCH_2CH_2X'$; and (3) Dehydrohalogenating said product to form $$CH_2=CHR'_fCH=CH_2$$

As stated above, step 3 is well known.

This product is useful as a crosslinking agent for fluorinated vinylic polymers.

The following examples are illustrative only and should not be construed as limited the invention, which is properly delineated in the appended claims.

Example 1

This example illustrates a process of synthesis that incorporates the process of this invention.

(a) An electro-chemical cell was prepared and fitted with a nickel anode and cathode and with a condenser designed to trap and return all volatiles condensing at −15° C. or above evolving from the cell. The top of the condenser was vented out-of-doors.

The cell was cooled to −10° C., and anhydrous HF vapor was added until about 2500 ml. of liquid HF were present in the cell. To this was added about 350 g. of n-octylmercaptan, and the cell was operated for 120 hours at about 0° C. with a direct current of about 85 amperes and 6.1 volts, another 1550 g. of n-octylmercaptan and an excess of HF being added in periodic additions throughout the electrolysis.

Following this, 1053 grams of n-$C_8F_{17}SF_5$ were isolated from the crude cell product, which corresponds to a yield of 18.8% based on the weight of the octylmercaptan. Yields which are higher than this are attainable by this technique.

(b) A vertical, one-inch alumina tube packed with nickel chips was heated to 500° C. along a one foot length of the tube. To the top of the tube there was slowly added 0.11 mole of n-$C_8F_{17}SF_5$ and 0.33 mole of bromine in such manner that there was good mixing of the two ingredients in the tube.

The effluent from the bottom of the tube was condensed and collected at room temperature. An 80.1 percent yield of n-$C_8F_{17}Br$ was recovered.

(c) Into a steel bomb equipped with a feeder line from a tank of ethylene there was placed 121 g. of n-$C_8F_{17}BR$ and 3 g. of ditertiarybutyl peroxide.

The bomb was then sealed, placed on a rocker, and heated at 115° C. under an ethylene pressure of 60 p.s.i. for 15 hours.

The product n-$C_8F_{17}CH_2CH_2Br$ was recovered in a 65% yield.

(d) When this product is heated for 4 hours at 90° C. in the presence of 300 cc. of ethyleneglycoldimethylether, 300 cc. of water, and 25 g. of KOH, a substantial yield of n-$C_8F_{17}CH=CH_2$ is produced.

Example 2

(a) A vertical one-inch alumina tube was packed with nickel turnings and placed in a tube furnace which heated a one foot section of the tube to 490° C.

Forty-five grams of $C_4F_9SO_2F$ and about 90 grams of liquid bromine were slowly added to the top of the tube so that there was good mixing between the two ingredients.

The effluent from the bottom of the tube was condensed at room temperature and collected.

From it was recovered a 73% yield of $C_4F_9Br$, as determined by gas-liquid chromatography and elemental analysis for bromine and sulfur.

Example 3

A vertical one-inch nickel tube was packed with nickel turnings and placed in a tube furnace which heated a one foot section of the tube to 490° C.

A roughly equimolar mixture of $C_8F_{17}SF_5$ and $$C_8F_{17}SO_2F$$

was slowly added to the top of the tube along with about twice their weight of liquid bromine.

The effluent from the bottom of the tube was condensed at room temperature and collected.

Infrared and chromatographic techniques of analysis showed that a substantial amount of $C_8F_{17}Br$ was produced, and that all reactants were largely consumed.

Example 4

When any of the following materials are electrolyzed at $-10°$C. in HF at 5.5 volts with a nickel cathode and anode, the following products are produced:

| | Reactant | Product |
|---|---|---|
| (a) | $C_2H_5SH$ | $C_2F_5SF_5$ |
| (b) | $(CH_3)_3CSH$ | $(CF_3)_3CSF_5$ |
| (c) | $(CH_3)_2CHCH_2CHSH$ $\mid$ $CH_3$ | $(CF_3)_2CFCF_2CFSF_5$ $\mid$ $CF_3$ |
| (d) | $n\text{-}C_7H_{15}SH$ | $n\text{-}C_7F_{15}SH_5$ |
| (e) | $n\text{-}C_{14}H_{29}SH$ | $n\text{-}C_{14}F_{29}SF_5$ |

When the above products are heated in a bomb containing carbon granules at 550° C. for ½ hour with a molar excess of chlorine or bromine, the following perfluoroalkyl bromides are produced:

| | | |
|---|---|---|
| I | Reacted with bromine | (a) $C_2F_5Br$ <br> (b) $(CF_3)_3CBr$ <br> (c) $(CF_3)_2CFCF_2CFBr$ $\mid$ $CF_3$ |
| II | Reacted with chlorine | (d) $n\text{-}C_7F_{15}Cl$ <br> (e) $n\text{-}C_{14}F_{29}Cl$ |

Example 5

When any of the following materials are passed along with a molar excess of chlorine or bromine, through a column packed with nickel turnings at a temperature of 525° C., the following products result:

| | Reactant | Product |
|---|---|---|
| I. Reacted with bromine | $CF_3CF_2CFCF_2CF_2SOF$ $\mid$ $CF_3$ <br> $\gamma\text{-}C_{18}F_{37}SO_2F$ <br> $(CF_3)_2CFSO_3Cl$ <br> 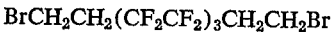 | $CF_3CF_2CFCF_2CF_2Br$ $\mid$ $CF_3$ <br> $n\text{-}C_{18}F_{37}Br$ <br> $(CF_3)_2CFBr$ <br> 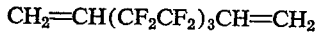 |
| II. Reacted with chlorine | $C_5F_{11}SO_3H$ <br> $(C_{10}F_{21}SO_2)_2O$ <br> $(C_2F_5SO_2)_2O$ <br> $C_4F_9H$ | $C_5F_{11}Cl$ <br> $C_{10}F_{21}C$, <br> $C_2F_5Cl$ <br> $C_4F_9Cl$ |

Example 6

A one-inch alumina tube packed with carbon granules was heated along a one foot section to the temperatures shown below, each temperature representing a different experiment.

A compound of the unit formula $H(CF_2CF_2)_3CH_2OH$ was added to one end of the tube at the rate of about 100 g. every 20 minutes, along with twice that molar amount of bromine.

The percents of the products recovered from the other end of the tube for each experiment are shown below:

| | Weight Percent | | | |
|---|---|---|---|---|
| Temperature | 500° C. | 550° C. | 600° C. | 650° C. |
| $H(CF_2CF_2)_3Br$ | 74.3 | 60.7 | 21.0 | 2.4 |
| $Br(CF_2CF_2)_2CF_2Br$ | 2.6 | 8.0 | 8.0 | 16.0 |
| $Br(CF_2CF_2)_3Br$ | 4.5 | 19.3 | 52.3 | 8.0 |
| $Br(CF_2CF_2)Br$ | 0 | 0 | 0 | 73.6 |

Example 7

A mixture of one molar part of $n\text{-}C_7F_{15}H$ and about two molar parts of bromine were passed through the packed alumina tube of Example 6.

The temperature of the tube for three separate runs and the mole percent yield of $C_7F_{15}Br$ is shown below.

| Temperature (° C.): | Percent yield |
|---|---|
| 500 | 29.0 |
| 550 | 49.5 |
| 600 | 81.4 |

Example 8

(a) A mixture of one molar part of $$n\text{-}C_7F_{15}CH_2CH_2Br$$

and about two molar parts of bromine were passed through the packed alumina tube of Example 6 at a temperature of 550° C.

A 35 mol percent yield of $n\text{-}C_7F_{15}Br$ was recovered on one pass.

(b) When the above experiment is repeated using $C_{12}F_{25}(CH_2)_4Br$ and bromine at a reaction temperature of 500° C., a substantial yield of $C_{12}F_{25}Br$ is recovered.

(c) When the experiment of (a) above is repeated using $C_4F_9(CH_2)_8Cl$, and chlorine at a reaction temperature of 510° C., a substantial yield of $C_4F_9Cl$ is recovered.

Example 9

A mixture of one molar part of $n\text{-}C_8F_{17}SF_5$ and slightly over one molar part of chlorine was passed through the packed alumina tube of Example 6 which was heated at 500° C.

A high yield of $n\text{-}C_8F_{17}Cl$ was recovered from the other end of the tube.

Example 10

(a) A mixture of 1 molar part of $n\text{-}C_8F_{17}SF_5$ and 2 molar parts of bromine were passed through an unpacked one-inch alumina tube, one foot of which was heated at 550° C.

A high yield of $n\text{-}C_8F_{17}Br$ was recovered.

(b) The experiment of (a) above was repeated, using chlorine instead of bromine.

A high yield of $n\text{-}C_8F_{17}Cl$ was recovered.

Example 11

When the product of Example 6 of the formula $$Br(CF_2CF_2)_3Br$$

is isolated and irradiated for 2 hours with gamma radiation while in an ethylene atmosphere under a pressure of 100 p.s.i., the product $$BrCH_2CH_2(CF_2CF_2)_3CH_2CH_2Br$$

is formed.

When this product is isolated and heated for 4 hours at 110° C. with a 10 weight percent water solution of potassium hydroxide, the product $$CH_2=CH(CF_2CF_2)_3CH=CH_2$$

is recovered.

Example 12

When 10 g. of $H(CF_2CF_2)_2OH$ are heated in a bomb for 10 minutes at 580° C. in the presence of 20 g. of chlorine, a product of the formula $Cl(CF_2CF_2)_2Cl$ is recovered.

Analogous results are obtained when this product is substituted for the $Br(CF_2CF_2)_3Br$ ingredient in the experiment of Example 11, the product in this case being $CH_2=CH(CF_2CF_2)_2CH=CH_2$.

That which is claimed is:
1. The process comprising reacting
   (a) a compound selected from the group consisting of
      (1) $R_fSF_5$,
      (2) $R_fSO_2X$,
      (3) $(R_fSO_2)_2O$,
      (4) $HR'_fCH_2OH$, and
      (5) $R_f(CH_2CH_2)_nX'$ with
   (b) a halogen selected from the group consisting of chlorine and bromine at a temperature of 450° C. to 700° C., whereby a compound selected from the group consisting of $R_fX'$ and $X'R'_fX'$ is produced, where
      $R_f$ is a perfluoroalkyl radical of 1 to 14 carbon atoms,
      $R'_f$ is a perfluoroalkylene radical of 2 to 10 carbon atoms,
      X is selected from the group consisting of fluorine, chlorine, bromine, and the hydroxyl group,
      X' is selected from the group consisting of chlorine and bromine, and
      $n$ has a value of 1 through 5.

2. The process of claim 1 where $R_fSF_5$ is used.
3. The process of claim 1 where $C_7F_{15}SF_5$ is used.
4. The process of claim 1 where $C_8F_{17}SF_5$ is used.
5. The process of claim 1 where $R_f$ contains 4 to 14 carbon atoms.
6. The process of claim 1 where (b) is bromine.
7. The process of claim 1 comprising reacting a compound of the formula $HR'_fCH_2OH$ with chlorine or bromine in the presence of an inert substrate at a temperature of 490° C. to 650° C. to form $X'R'_fX'$ where $R'_f$ is a perfluoroalkylene radical of 2 to 14 carbon atoms and X' is chlorine or bromine.

References Cited

UNITED STATES PATENTS

| | | |
|---|---|---|
| 2,519,983 | 8/1950 | Simons. |
| 2,700,688 | 1/1955 | Crane et al. |
| 2,985,690 | 5/1961 | Miller. |
| 3,055,953 | 9/1962 | Smeltz. |

FOREIGN PATENTS

| | | |
|---|---|---|
| 1,313,279 | 11/1962 | France. |
| 740,677 | 11/1943 | Germany. |

DANIEL D. HORWITZ, Primary Examiner

U.S. Cl. X.R.

204—163; 260—87.5, 448.2, 648, 653.1, 683.15, 884